Feb. 8, 1927.  F. E. PETERSON  1,616,984
TWO-PIECE DEMOUNTABLE RIM
Filed March 20, 1926
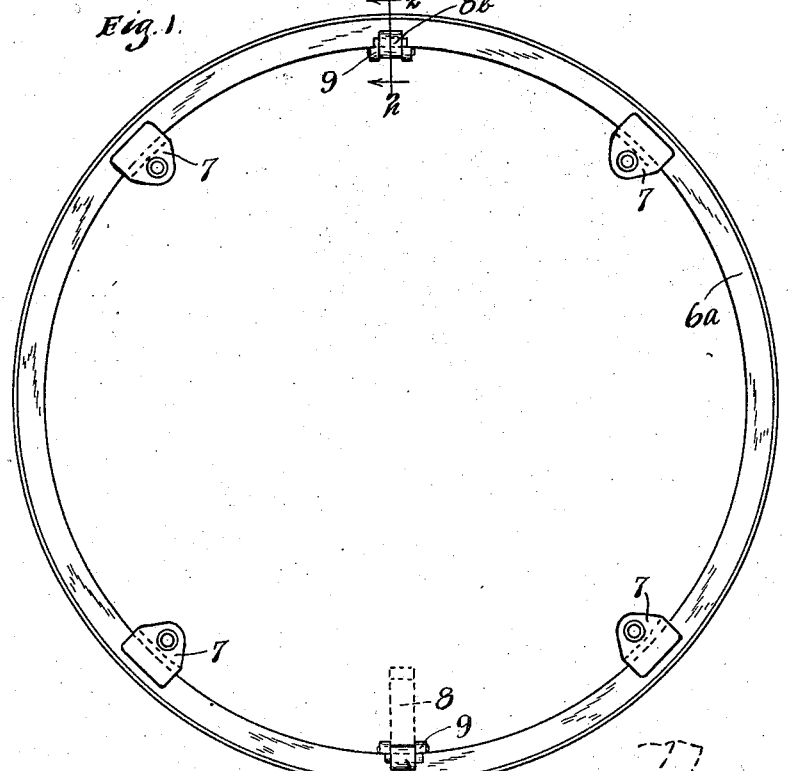
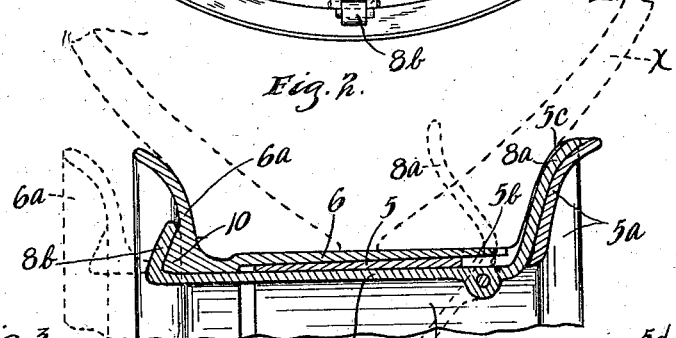
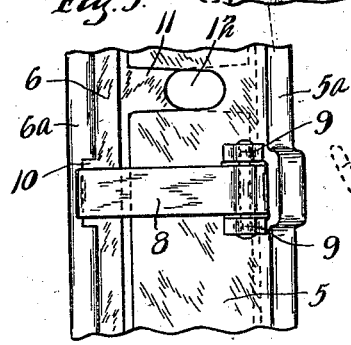
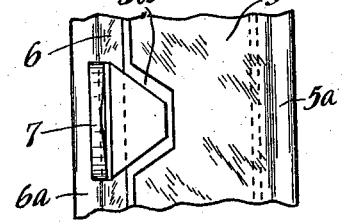
INVENTOR.
FRANK E. PETERSON.
BY HIS ATTORNEYS.
Williamson Reif & Williamson Patented Feb. 8, 1927.

1,616,984

UNITED STATES PATENT OFFICE.

FRANK E. PETERSON, OF ROY, MONTANA.

TWO-PIECE DEMOUNTABLE RIM.

Application filed March 20, 1926. Serial No. 96,202.

This invention relates to rims for automobile tires, and especially to demountable rims for holding pneumatic tires.

It is the main object of the invention to provide a simple but highly efficient rim which will permit the tire to be quickly and easily attached or detached therefrom without the employment of tools.

A further object of the invention is to provide a rim comprising a pair of telescoping sections adapted to retain the beads of the tire in combination with means for easily moving said sections apart to remove or attach a tire.

A further object of the invention is to provide in such a device a pair of telescoping clamping sections and a lever carried by one of the sections adapted to readily pry the same apart and to moreover lock the sections together when the tire is mounted on the rim. There has been a great deal of development in rims of various kinds, the problem being to enable the motorist to more easily attach or remove a tire, but to my knowledge all such devices require the employment of tools or a great amount of effort to compress a broken rim member, whereby the tire may be pulled thereover. With my device the two telescoping sections may be pried or cammed apart with little exertion and may be readily locked together when the tire is mounted thereon.

The above and other objects of the invention will be apparent from the following description made in connection with the accompanying drawings, wherein like characters refer to similar parts throughout the several views, and in which—

Fig. 1 is a side elevation of the assembled device.

Fig. 2 is a cross section on a larger scale taken on the line 2—2 of Fig. 1.

Fig. 3 is a fragmentary inner plan view showing the mechanism for separating and locking the rim sections together, and Fig. 4 is a fragmentary inner plan view showing the seating of a portion of the sections and one of the upstanding lugs for attachment to the felly of the wheel.

In the preferred form of the invention a pair of telescoping annular rim sections are provided, the inner section 5 having an annular tire abutting flange $5^a$ at one side thereof and provided with a pair of oppositely disposed apertures $5^b$ adjacent said tire abutting flange. It will be noticed that the outer surface of the section 5 is tapered slightly from the tire abutting flange toward its opposite edge. The outer section 6 of the rim comprises an annular body member forming a tire seat having the annular tire abutting flange $6^a$ at one side thereof, and having its inner surface, which is adapted to be seated against section 5, tapered slightly from its unflanged edge toward the tire abutting flange $6^a$. It will be apparent that when sections 5 and 6 are telescoped the same will be wedged tightly together.

Outer section 6 carries the usual circumferentially spaced upstanding eyes or lugs 7 through which bolts are adapted to be passed to secure the rim to the felly of the wheel in the usual manner. Inner section 5 is provided with a plurality of circumferentially spaced wedge shaped recesses $5^d$ to accommodate the base portions of eyes 7, whereby the sections 6 and 7 may be snugly telescoped together.

Substantially L-shaped levers 8 are provided hinged to inner section 5, by the manipulation of which the two rim sections may be pried apart and may also be locked together. In the drawings the device is shown equipped with two of these levers oppositely disposed on the rim although in actual practice, of course, any desirable number may be used. Levers 8 are shown pivoted between transverse lugs 9 disposed at opposite sides of each of the apertures $5^b$ in the inner rim section. The shorter arm of each of the levers projects through one of said apertures $5^b$ and when the rim sections are telescoped fits snugly within the groove $5^c$ provided in the tire abutting flange carried by inner section 5. It will be seen that the shorter or locking arm of lever 8, therefore, is interposed between tire abutting flange $5^a$ and the adjacent edge of outer or tire carrying section 6. The longer arm of each of levers 8 terminates in an outwardly bent locking portion $8^b$ adapted to resiliently engage one of the flanges 10 on the outer edge of outer section 6 and thereby securely lock the two rim sections together when they are telescoped. The air pressure on the beads of the tire (see Fig. 2) of course tends to force the two sections apart, thereby firmly locking the parts together and causing tight engagement between flange 10 and locking hook $8^b$.

To accommodate the valve of the tire a transverse slot 11 is formed in the unflanged edge of section 5 and a similar slot 12 formed in the unflanged edge of section 6. These slots are adapted to register to leave an aperture for the valve as shown in Fig. 3 when the two rim sections are telescoped.

*Operation.*

The operation is probably obvious from the foregoing description but may be briefly summarized as follows:

Assuming that the tire X is mounted on the rim as illustrated in Fig. 2, with the sections locked in telescoped position, it is first necessary to release the lock hooks 8b in order to remove the tire. When the tire is deflated the rim sections may be easily forced a trifle more closely together whereby the hooks 8b may readily be released. There is preferably sufficient resiliency in said hooks to permit them to be sprung out with a tool if so desired. When levers 8 are swung inwardly it will be obvious that the unflanged edge of outer section 6 will be engaged by the locking arms of the levers and the tight engagement between the sections will be broken, section 6 which forms the seat for the tire being moved transversely of section 5 as indicated in the dotted lines in Fig. 2. The sections are entirely separated, after which the tire may be readily removed from section 6.

In mounting the tire upon the rim, the operation is the reverse of the above, the tire first being slid upon section 6 and the inner section 5 telescoped within outer section 6. The sections will then be locked together before the tire is inflated by forcing the locks 8b outwardly to engage the locking flanges 10. Then upon inflation of the tire, tight engagement is made between the inter-engaging locking parts. It will also be noticed that the working arm of the lever is forced flush against its seat 5c, thus preventing the locking ends 8b from disengagement with their flanges 10.

The wedge shaped bases of lugs 7 engaging the recessed portions 5d of the unflanged edge of section 5 prevent the sections from creeping one upon the other. It will also be noticed that the lugs 7 are rigid with the outer section 6, thereby preventing the rim from creeping upon the felly.

From the above description it will be seen that I have invented a two-piece telescoping tire rim comprising extremely few parts and adapted to permit a tire to be mounted or detached therefrom with very little exertion and without the assistance of any tools. The rim is adapted to fit standard wheels and to be carried in the manner of most demountable rims.

It will of course be understood that various changes may be made in the form, details, proportions and arrangement of parts without departing from the scope of the invention.

What is claimed is:

1. A tire rim comprising inner and outer telescoping sections, said outer telescoping section affording a tire seat and provided with an annular tire abutting flange at one side thereof, said inner telescoping section provided with an annular tire abutting flange at one side thereof, and means mounted on one of said sections adapted to be forced outwardly against the side of said other section to pry said sections apart when telescoped.

2. A tire rim comprising inner and outer telescoping sections, said outer telescoping section affording a tire seat and provided with an annular tire abutting flange at one side thereof, said inner telescoping section having an annular tire abutting flange at one side thereof, and means mounted on said inner section and extending therethrough for engaging said outer section to pry said sections apart when telescoped.

3. A tire rim comprising inner and outer telescoping sections, said outer telescoping section affording a tire seat and provided with an annular tire abutting flange at one side thereof, said inner telescoping section comprising an annular tire abutting flange at one side thereof and means hinged to said inner section and interposed between said inner section and said outer section to pry said sections apart when telescoped.

4. The structure set forth in claim 3 and said means also comprising a locking member adapted to engage said outer section to lock said sections together when in telescoped position.

5. A tire rim comprising inner and outer telescoping sections, said outer telescoping section affording a tire seat and provided with an annular tire abutting flange at one side thereof, said inner telescoping section comprising an annular tire abutting flange at one side thereof and a lever hinged to said inner section and having its working end disposed between the flange of said inner section and the inner edge of said outer section and normally disposed flush against said inner section and capable of being swung to pry said sections apart.

6. A tire rim comprising inner and outer telescoping sections, said outer telescoping section affording a tire seat and provided with an annular tire abutting flange at one side thereof, said inner telescoping section comprising an annular tire abutting flange at one side thereof, and having an aperture therethrough adjacent said tire abutting flange and a lever passed through said aperture and hinged to said inner section having a working arm adapted to lie flush with said tire abutting flange when a tire is held by said rim and adapted to be swung to pry said sections apart.

7. The structure set forth in claim 6 and resilient means adjacent the handle end of said lever adapted to engage said outer section to lock said sections together when telescoped.

8. A tire rim comprising inner and outer telescoping sections, said outer telescoping section affording a tire seat and provided with an annular tire abutting flange at one side thereof, said inner telescoping section having an annular tire abutting flange at the outer side thereof, a lever pivoted to said inner section and having one of its ends extending therethrough adapted to normally lie against the tire abutting flange of said inner section and to be swung against said outer section to pry said sections apart, the opposite end of said lever being adapted to normally lie flush against the under side of said inner section, and means adjacent the outer extremity of said end for engaging the outer side of said outer section to lock said sections together.

9. A tire rim comprising inner and outer telescoping sections, said outer telescoping section affording a tire seat, co-operating means on said inner and outer sections adapted to engage to prevent said sections from revolving relatively in each other, means extending through said inner section adapted to engage said outer section to pry said sections apart when telescoped, and means for locking said sections in telescoped position.

In testimony whereof he does affix his signature.

FRANK E. PETERSON.